No. 687,884. Patented Dec. 3, 1901.
M. B. HILL.
CLAMPING DOG.
(Application filed Aug. 15, 1900.)
(No Model.)
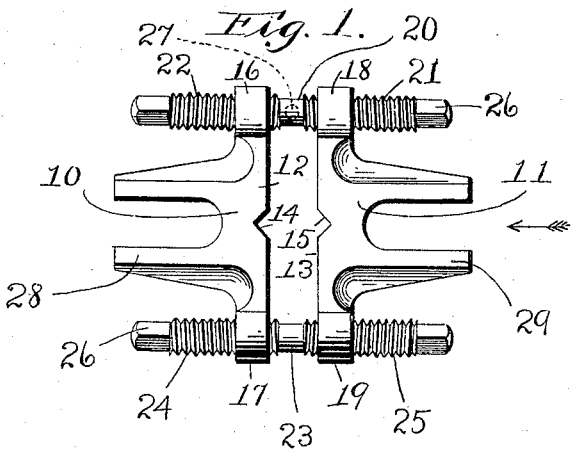
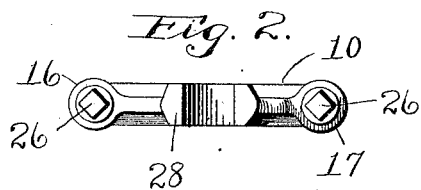
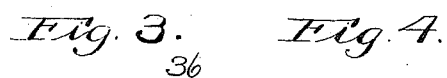
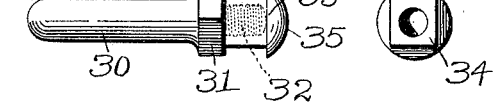
Witnesses
C. F. Wesson
John L. Gould
Inventor
Milton B. Hill
by Claus C. Higgins
his attorney

UNITED STATES PATENT OFFICE.

MILTON B. HILL, OF WORCESTER, MASSACHUSETTS.

CLAMPING-DOG.

SPECIFICATION forming part of Letters Patent No. 687,884, dated December 3, 1901.

Application filed August 15, 1900. Serial No. 26,940. (No model.)

*To all whom it may concern:*

Be it known that I, MILTON B. HILL, a citizen of the United States of America, and a resident of the city of Worcester, county of Worcester, State of Massachusetts, have invented certain new and useful Improvements in Clamping-Dogs, of which the following is a specification.

My invention relates to a dog or clamp, and more particularly it has to do with a grinder or lathe dog, to which use it is peculiarly adapted. The common lathe-dog used to clamp the work and to engage the face-plate to revolve therewith is not balanced with relation to the axis of revolution, so that when the work is speeded up there is a tendency for it to run out of the true axis. In cylindrical and other grinding and even in lathe work this often affects the accuracy of the work.

One object of my invention is to provide an adjustable dog or clamp which is balanced in any adjustment thereof, also to provide a clamp-dog particularly adapted to hold work in grinding, a clamp which is easily and quickly adjusted and one which is adapted to be used with a lathe or grinder. These and other objects, which will appear upon a full disclosure of my invention, are accomplished by the device hereinafter described and claimed.

Figure 1 is a plan or top view of the clamp or dog. Fig. 2 is an end elevation thereof. Fig. 3 is a view of one form of removable tail. Fig. 4 is the end view of the nut shown in side view, Fig. 3. Figs. 5 and 6 are side and end views, respectively, of a different form of removable tail.

The clamp or dog is formed of two similar clamp-sections 10 11. The clamping-faces 12 13 are provided with the right-angular notches 14 15, respectively, near the middle of the faces to center the work in the clamp. The section 10 is provided with the lugs 16 17 at the respective ends of the clamping-face 12. The section 11 is also provided with similar lugs 18 19, located at the respective ends of the clamping-face 13 opposite the lugs 16 17, respectively. The lugs 16 18 are bored and threaded from their faces in opposite directions, respectively—that is, by right and left hand threads—to receive the threaded bolt 20. The bolt 20 is threaded for a portion of its length, amounting to nearly one-half, with the thread 21 to fit the thread in the lug 18 and for the other portion of its length with the thread 22 to fit the thread in the lug 16. A similar bolt 23 is provided with threads 24 25 to fit the similarly-threaded holes in the lugs 17 19, respectively. The ends of each bolt are provided with square heads, such as 26, to which a wrench may be applied, or, if preferred, the portions of the bolts between the screws may be nurled, so that they may be grasped and turned easily between the thumb and finger, and also provided with holes, as indicated by dotted lines, (marked 27,) to fit a pin, by which the screw may be turned to clamp the sections fast on the work. From the clamp-sections 10 and 11, respectively, are provided similar bifurcated engaging extensions 28 29 to engage the means on the machine in which the work is held to revolve the clamp with the work. Such means are commonly provided on grinding machinery and are balanced on the machine.

If used with the ordinary lathe face-plate or in any way which requires a tail to extend from the dog, such an attachment is provided, as shown in Figs. 3 and 4 or 5 and 6.

The tail 30 in Fig. 3 is provided with the square shoulder 31 and the threaded shank 32. The nut 33 fits this threaded shank, the square portion 34 fitting the bifurcation of either clamping-section. The rounded head 35 of the nut provides a shoulder 36, and the distance from said shoulder to the end of the nut is slightly less than the thickness of the bifurcated extensions, so that when the tail is turned up by means of the square shoulder 31 the bifurcated extension is clamped between this shoulder and the shoulder 36 of the nut, holding the tail firmly.

In Fig. 5 the tail 37 is provided with the right-angled extension 38, which fits the bifurcations of the sections. The extension 38 is split, as at 39, and is provided with the taper screw-threaded hole 40. The taper screw which fits this hole forces the split sections apart, holding the extension firmly in the bifurcated section. In this latter form of dog no extension presents itself on the side of the dog opposite that from which the tail extends. In either form of tail the use of a tail in both clamping-sections preserves the balance of the dog.

It will be seen from the above description that when the bolts 20 23 are turned and the clamping-sections are in any position all parts of the dog are in balance. Each clamping-section moves to and from the middle of the bolts the same distance on each side, thus preserving the balance.

Changes may be made in the form of construction shown without departing from the spirit of my invention; but such changes are within its scope.

What I claim, and desire to secure by Letters Patent, is—

1. The combination with balanced clamping-sections, of right and left handed screw-bolts engaging said sections, and an extension extending from a section between said screw-bolts, substantially as described.

2. The combination with similar balanced clamping-sections, of similar right and left handed screw-bolts engaging said sections, and similar extensions extending from said sections between said bolts, substantially as described.

3. The combination with the similar balanced clamping-sections, of the balanced screw-bolts connecting said sections upon opposite sides of the clamping-faces thereof, said bolts each being provided with the right and left handed threads for engaging said sections respectively whereby the dog is balanced in any adjustment, substantially as described.

4. An adjustable similar balanced dog comprising the clamping-sections, oppositely-threaded screw-bolts connecting said clamping-sections for adjusting the same in balance to any position, and similar engaging means for revolving said dog, extending from each clamping-section, substantially as described.

5. The combination with the similar clamping-sections, each having threaded lugs located opposite similar threaded lugs on the other section, similar screw-bolts each provided with right and left handed threads, said threads respectively engaging the oppositely-located lugs, and engaging extensions for revolving said clamp, substantially as described.

6. The combination with the similar clamping-sections having the bifurcated engaging extensions, similar threaded bolts each provided with right and left handed threads, said threads engaging threaded holes in said sections respectively, whereby as said sections are moved into any adjustment said clamp will remain balanced in relation to its axis of revolution.

7. In a clamping-dog, the combination with a movable threaded clamping-section provided with a bifurcated extension, of a removable tailpiece adapted to be held in said bifurcated extension, substantially as described.

8. In a clamping-dog, the combination with a clamping-section having an opening to receive a tailpiece, of a removable tailpiece provided with a split extension, and a taper screw, whereby said split extension may be spread and the tailpiece clamped to said section, substantially as described.

Signed by me at Worcester, Massachusetts, this 20th day of July, 1900.

MILTON B. HILL.

Witnesses:
ALDUS C. HIGGINS,
HENRY L. PARKER.